(12) United States Patent
Ismert (10) Patent No.: US 10,436,358 B2
(45) Date of Patent: Oct. 8, 2019

(54) FILL VALVES FOR TOILETS

(71) Applicant: Dominic P. Ismert, Marshall, MI (US)

(72) Inventor: Dominic P. Ismert, Marshall, MI (US)

(73) Assignee: Dominic P. Ismert, Marshall, MI (US)

( * ) Notice: Subject to any disclaimer, the term of this patent is extended or adjusted under 35 U.S.C. 154(b) by 0 days.

(21) Appl. No.: 14/529,333

(22) Filed: Oct. 31, 2014

(65) Prior Publication Data

US 2015/0122343 A1  May 7, 2015

Related U.S. Application Data

(60) Provisional application No. 61/898,930, filed on Nov. 1, 2013, provisional application No. 61/898,916, filed on Nov. 1, 2013, provisional application No. 61/898,901, filed on Nov. 1, 2013.

(51) Int. Cl.

| | |
|---|---|
| *F16K 31/18* | (2006.01) |
| *F16L 19/02* | (2006.01) |
| *F16L 55/115* | (2006.01) |
| *E03D 1/32* | (2006.01) |
| *E03C 1/02* | (2006.01) |
| *F16K 5/06* | (2006.01) |
| *F16K 27/06* | (2006.01) |

(52) U.S. Cl.
CPC .......... *F16L 19/0231* (2013.01); *E03C 1/021* (2013.01); *E03D 1/32* (2013.01); *F16K 5/061* (2013.01); *F16K 27/067* (2013.01); *F16L 55/1152* (2013.01); *Y10T 137/0447* (2015.04); *Y10T 137/0486* (2015.04); *Y10T 137/0491* (2015.04); *Y10T 137/5109* (2015.04); *Y10T 137/7361* (2015.04); *Y10T 137/7413* (2015.04); *Y10T 137/7462* (2015.04)

(58) Field of Classification Search
CPC ......... Y10T 137/0447; Y10T 137/0486; Y10T 137/6004; Y10T 137/7361; Y10T 137/7433; Y10T 137/7413; Y10T 137/86348
See application file for complete search history.

(56) References Cited

U.S. PATENT DOCUMENTS

| | | | |
|---|---|---|---|
| 2,080,271 A | 5/1937 | Hirst | |
| 2,886,067 A | 5/1959 | Maxwell et al. | |
| 3,194,258 A * | 7/1965 | Grant | E03D 1/32 137/218 |
| 3,693,649 A * | 9/1972 | Gordon | F16K 31/34 137/414 |

(Continued)

FOREIGN PATENT DOCUMENTS

WO        00/19136        4/2000

OTHER PUBLICATIONS

Merriam-Webster. "Integrated" Jul. 2016.*
U.S. Appl. No. 14/529,264 Office Action dated May 4, 2016 (23 pages).

*Primary Examiner* — Robert K. Arundale
(74) *Attorney, Agent, or Firm* — Polsinelli PC (57) ABSTRACT

A fill valve assembly for a toilet tank is described. The fill valve assembly includes a two part design. The fill valve assembly includes a fill valve that connects or engages with a shank. A connection between the fill valve and the shank is located in an interior of the tank, which is easily accessed. The fill valve may be easily replaced by disconnecting the fill valve from the shank.

25 Claims, 5 Drawing Sheets

(56) References Cited

U.S. PATENT DOCUMENTS

| | | | |
|---|---|---|---|
| 3,773,063 A * | 11/1973 | Roosa | E03D 1/085 137/217 |
| 3,994,313 A * | 11/1976 | Brandelli | F16K 31/34 137/437 |
| 4,094,327 A * | 6/1978 | Brandelli | E03D 1/32 137/403 |
| 4,100,928 A * | 7/1978 | Schoepe | F16K 31/34 137/15.18 |
| 4,431,024 A * | 2/1984 | Gallagher | F16K 31/34 137/413 |
| 4,434,811 A | 3/1984 | Murdoch | |
| 4,478,438 A | 10/1984 | Elorriaga, Jr. | |
| 4,573,712 A | 3/1986 | Cameron | |
| 4,592,388 A | 6/1986 | Wilcox | |
| 4,600,031 A * | 7/1986 | Nestich | E03C 1/102 137/218 |
| 4,678,161 A | 7/1987 | Bando et al. | |
| 4,730,639 A * | 3/1988 | Antunez | F16K 31/34 137/312 |
| 4,801,160 A | 1/1989 | Barrington | |
| 4,923,221 A | 5/1990 | Taylor | |
| 5,007,452 A * | 4/1991 | Antunez | F16K 31/34 137/414 |
| 5,035,257 A * | 7/1991 | Antunez | F16K 31/34 137/414 |
| 5,246,200 A | 9/1993 | Barker | |
| 5,287,882 A * | 2/1994 | Mikol | E03D 1/00 137/410 |
| 5,595,368 A | 1/1997 | Bogdany et al. | |
| 5,694,978 A | 12/1997 | Heilmann et al. | |
| 6,102,067 A * | 8/2000 | Orlando | E03D 1/32 137/315.08 |
| 6,481,761 B2 | 11/2002 | Schroeder et al. | |
| 7,204,267 B1 | 4/2007 | Persico | |
| 7,328,723 B1 | 2/2008 | Van Meter | |
| 2002/0109116 A1 | 8/2002 | Stolzman | |
| 2002/0140221 A1 | 10/2002 | Cooper et al. | |
| 2005/0127664 A1 | 6/2005 | Arth et al. | |
| 2006/0192382 A1 | 8/2006 | Martineau | |
| 2008/0012326 A1 | 1/2008 | Braathen et al. | |
| 2008/0209619 A1 * | 9/2008 | Bouchard | E03D 1/00 4/300 |
| 2009/0032761 A1 | 2/2009 | Tsai | |
| 2010/0163131 A1 | 7/2010 | Fehr et al. | |
| 2010/0276425 A1 | 11/2010 | Stobbart | |
| 2012/0043757 A1 * | 2/2012 | Williams | F16L 19/103 285/339 |
| 2012/0067436 A1 | 3/2012 | Jacoway | |
| 2012/0273064 A1 | 11/2012 | Ismert et al. | |
| 2013/0000771 A1 | 1/2013 | Beaton et al. | |
| 2015/0059862 A1 * | 3/2015 | Spears, II | F16L 39/005 137/15.09 |
| 2015/0122342 A1 | 5/2015 | Ismert | |
| 2015/0308593 A1 | 10/2015 | Brouwer et al. | |

\* cited by examiner

FILL VALVES FOR TOILETS

CROSS REFERENCE TO RELATED APPLICATIONS

This application claims the benefit of U.S. Provisional Patent Application No. 61/898,930 filed Nov. 1, 2013, U.S. Provisional Patent Application No. 61/898,916 filed Nov. 1, 2013, and U.S. Provisional Patent Application No. 61/898,901 filed Nov. 1, 2013, which are all hereby incorporated by reference in their entireties. U.S. Non-Provisional application Ser. No. 14/529,264, filed Oct. 31, 2014, is also hereby incorporated by reference.

FIELD OF INVENTION

The present invention relates to fill valves for toilets.

BACKGROUND OF INVENTION

Fill valves are typically installed in the bottom of toilet tanks. The installation of the fill valves usually occurs in the field, but sometimes the fill valves are installed to the toilet tank in the factory. Typical fill valves include a one piece construction that is positioned in the tank with a bottom portion extending through a hole in a bottom wall of the tank. A nut is threaded to the bottom portion to secure against the bottom surface of the toilet tank.

Fill valves routinely fail due to constant use, hard water, and failed internal seals. Fill valves are typically replaced every 3 to 5 years. When they are replaced, an installer must use a bucket and towel, as the excess water that cannot be flushed (that pools beneath the edge of the flush valve) empties out the bottom of the tank. Moreover, the nut that secures the fill valve to the tank is below the tank, which may difficult to access. Finally, the entire fill valve is typically discarded during the replacement process.

Also, many fill valves are cracked or split during the installation when the installers are tightening the nut that connects the fill valve to the toilet tank or when the hose connector of a water supply is connected to the fill valve. When the fill valve is cracked or split, the whole fill valve must be replaced.

Finally, some fill valves have an over molded brass shank at the base. About 20% to 30% by volume of all fill valves sold in the United States have this over molded design. Unfortunately, when these fill valves fail, the brass shank is discarded with the fill valve.

SUMMARY

A fill valve assembly for a toilet tank is described. The fill valve assembly includes a two part design. The fill valve assembly includes a fill valve that connects or engages with a shank. A connection between the fill valve and the shank is located in an interior of the tank, which is easily accessed. The fill valve may be easily replaced by disconnecting the fill valve from the shank. During replacement, the shank is not removed or unsealed from the tank. As such, replacement of the fill valve is convenient, easy, and does not require clean-up. Importantly, the brass shank, which typically does not fail, is not discarded by the replacement of the fill valve.

The replacement of the fill valve does not require a bucket or towel. The old fill valve is disconnected from the shank in the inside of the tank and replaced with a new fill valve. The new fill valve may connect to the old shank. The old shank does not typically require removal from a fill valve hole in the bottom of the tank, so residual water in the tank will not drip out the fill valve hole.

The shank described herein may be made with a brass construction. The toilet may only require a single installation of the brass shank during the lifetime of the toilet. The use of a brass shank will generally reduce claims caused by failed plumbing connections. This reduces costs.

The fill valve assembly also helps to prevent over tightening. The connecting device maintains the seal or connection between the shank and the fill valve. The shank and the fill valve have an engineered seal and need not be over tightened.

The fill valve uses a male and female fitting combination that enables a user or installer to make a sealed connection on an internal diameter of the shank by way of an o-ringed male part of the fill valve assembly. The internal diameter of the shank provides a female part. A connecting device is rotatably attached to the male part. The connecting device also engages to an outer surface of the female part such that the sealed fitting assemblies will not disconnect under normal pressure of a fluid working through the assemblies.

In some aspects, the shank may be pre-installed to the tank at the factory. This may make it more likely that the installer/final owner will use and continue to use and/or replace the fill valve with the same brand of the fill valve.

In one aspect, a fill valve assembly for a toilet tank is described. The fill valve assembly includes a shank. The shank includes a lower end and an upper end. The upper end includes an internal diameter. The fill valve assembly further includes a fill valve, which includes a shaft, a supply end, and a connecting device. The supply end seals against the internal diameter of the upper end of the shank. The connecting device secures the supply end to the upper end of the shank to maintain the seal between the supply end and the upper end of the shank.

In another aspect, a fill valve assembly for a toilet tank is described. The fill valve assembly includes a shank, which includes a lower end and an upper end. The upper end includes a first sealing surface. The fill valve assembly includes a fill valve, which includes a shaft, a connecting device, and a second sealing surface. The first sealing surface of the shank seals with the second sealing surface of the fill valve. The connecting device engages the fill valve to the upper end of the shank.

In another aspect, a fill valve for a toilet tank is described. The fill valve includes a float. The fill valve includes a shaft, which includes a lower end with an external sealing surface. A connecting device rotatably engages to the lower end of the shaft. The connecting device covers at least a portion of the external sealing surface.

In another aspect, a fill valve assembly is described. The fill valve includes a male part. The male part includes one or more o-rings positioned about an exterior of the male part. A shank includes a female part, which includes an internal sealing surface and an outer engaging surface. The internal sealing surface of the female part receives the shank of the male part in a sealing engagement. A connecting device is rotatably attached to the male part. The connecting device engages the outer engaging surface of the female part to hold the male part and the female part together to maintain the sealing engagement.

In another aspect, a toilet tank is described. The tank defines a reservoir to hold water. An opening is in a bottom wall of the tank. A shank passes through the opening. A nut secures the shank to the tank. The nut tightens against a lower surface of the bottom wall. A fill valve connects to an upper end of the shank. The upper end passes into an interior of the tank.

In another aspect, a method of installing a fill valve for toilet tank is described. The method includes passing a shank through an opening of a toilet tank, wherein an upper end of the shank is in the toilet tank. The method includes providing a fill valve. The method includes engaging the fill valve to the upper end of the shank.

In another aspect, a method of replacing a fill valve is described. The method includes disconnecting a first fill valve from a shank, wherein the shank passes through an opening of a toilet tank, wherein the upper end of the shank is in the toilet tank. The method includes connecting a second fill valve to the upper end of the shank.

DETAILED DESCRIPTION OF INVENTION

A fill valve assembly 5 is shown in FIGS. 1-5. The fill valve assembly 5 is used in a toilet bowl tank 210 control a refilling of the tank 210 after the tank 210 is flushed. The fill valve assembly 5 includes a fill valve 200 that engages to a shank 220. The shank 220 passes through an opening 212 of the tank 210. The shank 220 includes a lower end 230 and an upper end 240. A water supply line 238 is engaged to the lower end 230 to provide fresh water to the tank 210.

The fill valve 200 may include a float 202 that rises and falls with the fluctuation of the water level in the toilet bowl tank 210. When the float 202 rises to a determined level, the fill valve 200 shuts off the water supply into the toilet bowl tank 210. In the aspect shown in the FIGS. 1-5, the float 202 travels on a vertical axis provided by a valve body 205. In other aspects, the float 202 may connect to the fill valve 210 by an arm or other lever extending from the fill valve 210. The valve body 205 may be adjustable in height in order to determine a level of water in the tank 210.

Figure 1:
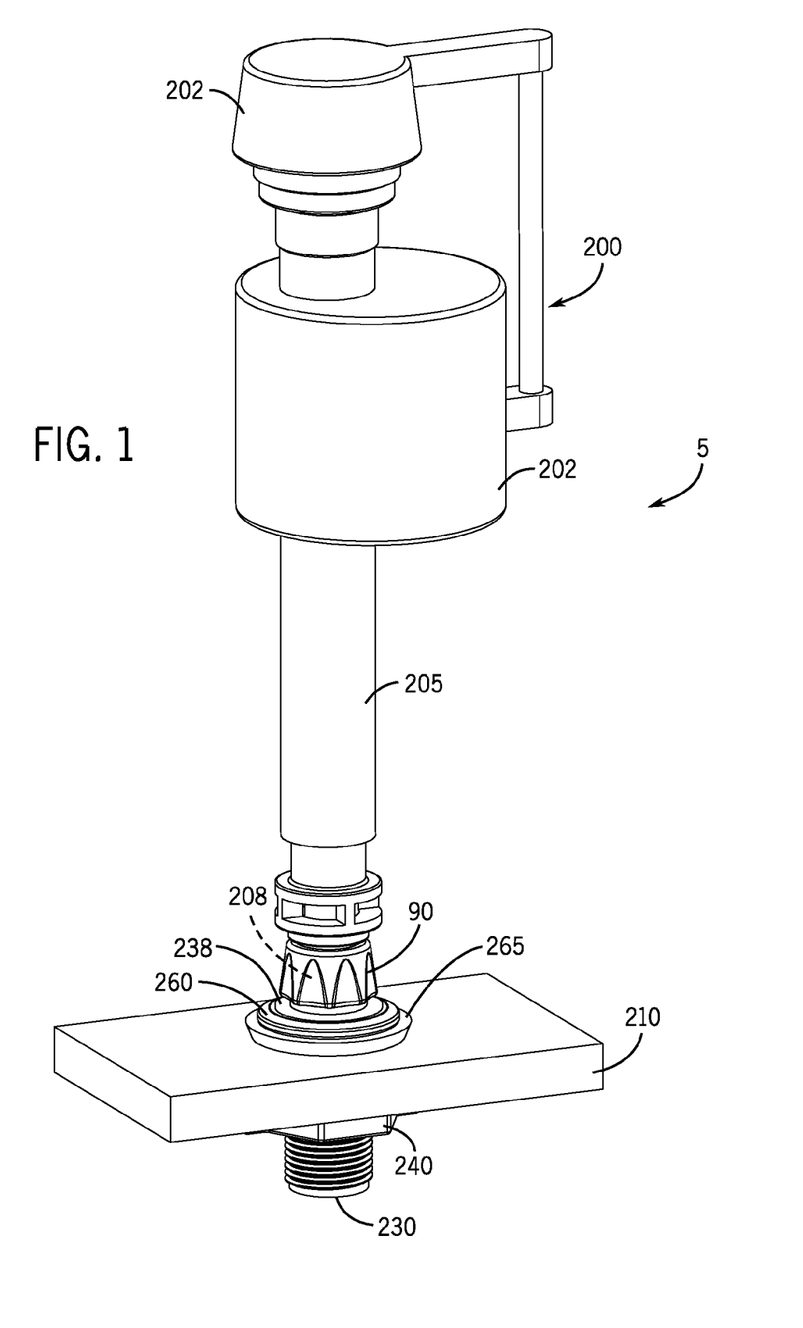
FIG. 1 is a perspective view of the fill valve assembly installed to a toilet tank.
Figure 2:
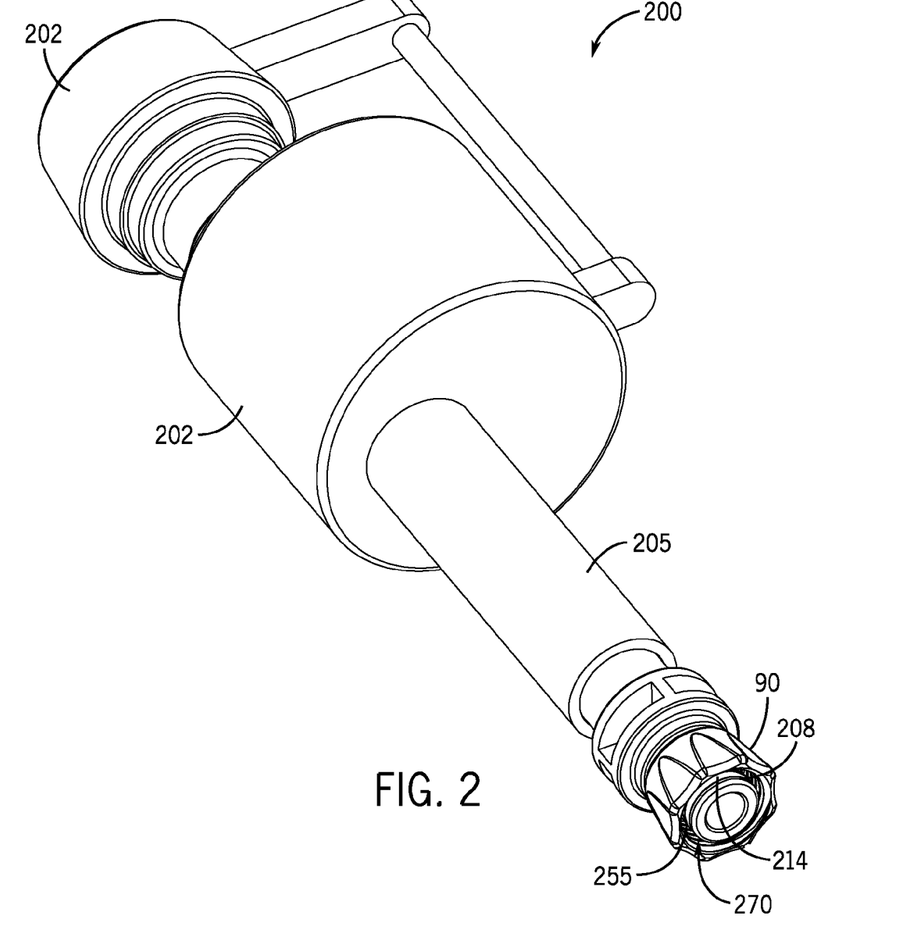
FIG. 2 is a bottom perspective view of the fill valve assembly.
Figure 3:
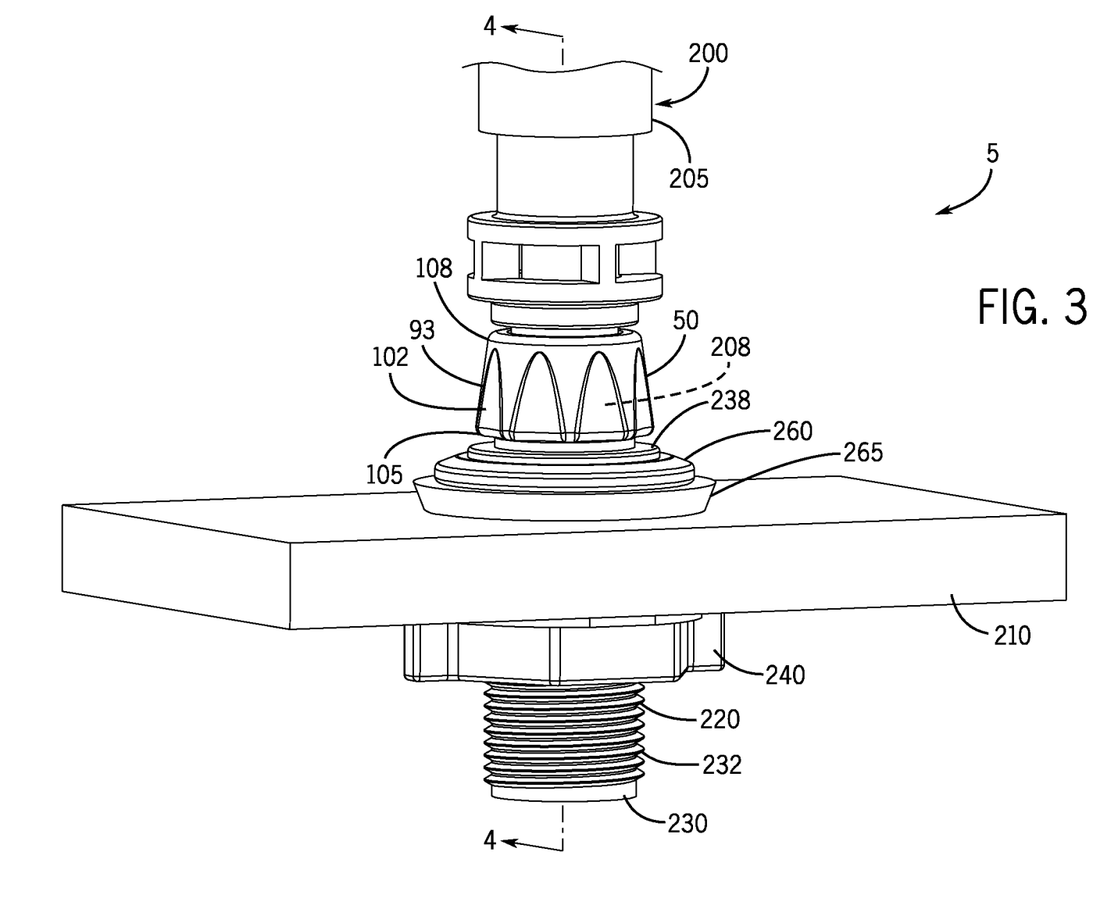
FIG. 3 is a close-up, perspective view of the fill valve assembly installed to a toilet tank.
Figure 4:
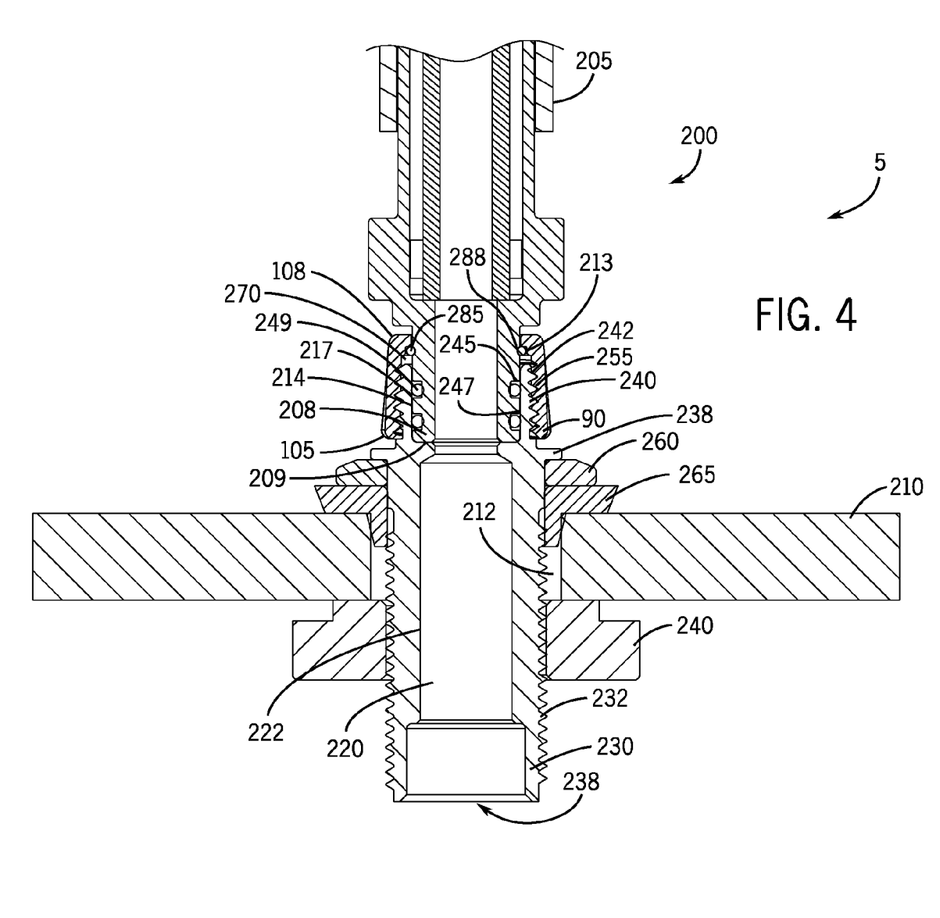
FIG. 4 is a sectional view of the fill valve assembly installed to a toilet tank.

The valve body 205 includes a supply end 208 and a connecting device 90, which engages or connects to the shank 220. The supply end 208 is generally formed on a lower portion of the fill valve 200. The supply end 208 is generally formed opposite of the float 202. With reference to FIG. 4, the connecting device 90 engages the supply end 208 with the upper end 240 of the shank 220. The connecting device 90 fluidly connects with the upper end 240 of the shank 220 to provide water to the fill valve 200.

During installation, the shank 220 is inserted through the opening 212 of the tank 210. The upper end 240 of the shank 220 passes into the tank 210, and the lower end 230 is positioned outside of and below the tank 210. The lower end 230 of the shank 220 includes an external threaded surface 232. A nut 240 threadingly engages the external threaded surface 232 to tighten the shank 220 to the toilet bowl tank 210. The water supply line 238 supplies water to the fill valve 200 in order to fill the toilet bowl tank 210. In other aspects, the lower end 230 of the shank 220 may include other connection surfaces and connection types to engage the water supply line 238.

Figure 5:
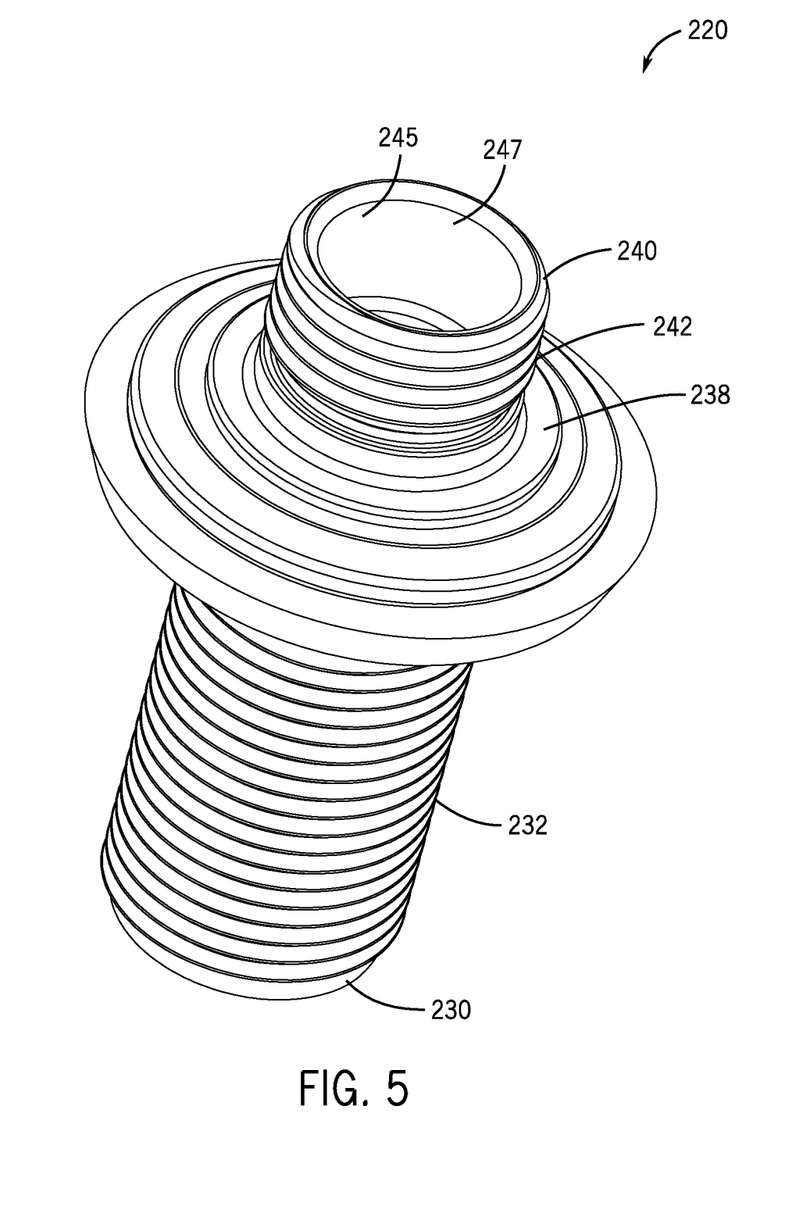
FIG. 5 is a perspective view of the shank.

The shank 220 will now be described in greater detail. With reference to FIG. 5, the shank 220 includes the lower end 230, which connects to the water supply 238. The lower end 230 includes the external threaded surface 232. The shank 220 further defines an internal diameter 245 that provides for fluid flow through the shank 220. The lower end 230 is integral with or transitions into the upper end 240. In some aspects, the shank 220 expands in width or diameter to form a lip 238. The lip 238 forms a shoulder, flange, or the like that catches a washer 260 to urge the washer 260 against a seal 265 in order to seal the shank 220 to the tank 210. The lip 238 is generally positioned between the lower end 230 and the upper end 240 of the shank 220. The shank 220 may include the lower end 230 generally opposite of the upper end 240. When the nut 240 is tightened to the lower end 240 of the shank 220, the lip 238 is pulled closer to the tank wall 210, thus pulling the washer 260 and compressing the seal 265 against the opening 212 of the tank 210.

The upper end 240 of shank 220 includes a threaded external diameter 242. Opposite of the threaded external diameter 242, the upper end 240 includes the internal diameter 245 that forms an internal sealing surface 247. The internal diameter 245 is generally smooth through the internal sealing surface 247.

The connecting device 90 is rotatably engaged to the fill valve body 205. The supply end 208 forms a male part that inserts into the upper end 240 of shank 220. The connecting device 90 threadingly engages to the threaded external diameter 242 of the upper end 240 of the shank 220. Although the connecting device 90 is exemplified as a nut in FIGS. 1-5, the connecting device 90 may include any number of devices that maintain the seal between the supply end 208 and the shank 220.

The connecting device 90 is held in the rotational engagement to the supply end 208 via a retaining ring 213. The retaining ring 213 circumscribes the supply end 208. The supply end 208 includes a groove 288 that receives the retaining ring 213. The connecting device 70 includes a shoulder 285 that catches against the retaining ring 213. Until tightened to the shank 220, the connecting device 90 may freely rotate relative to the supply end 208.

An annular gap 270 is formed between a threaded internal diameter 255 of the connecting device 90 and the supply end 208 of the fill valve 200. This annular gap 270 forms a space or void that is sized to receive the upper end 240 of the shank 220. This annular gap 270 may extend approximately from the groove 288 holding the retaining ring 213 to a tip 209 of the supply end 208.

The supply end 208 of the valve body 205 forms a sealing surface 214. The sealing surface 214 is formed externally on the supply end 208. The sealing surface 214 is formed on the outer diameter of the supply end 208. The sealing surface 214 may include one or more grooves 217. The sealing surface 214 may be generally smooth between the one or more grooves 217. The sealing surface 214 may have intermittent smooth surfaces that form the sealing surface 214. The grooves 217 may retain or include o-rings 249 that form a seal between the sealing surface 214 of the supply end 208 and the internal sealing surface 247 of the upper end 240 of the shank 220. The insertion of the supply end 208 into the upper end 240 of the shank 220 forms a sealing engagement between the internal sealing surface 247 of the upper end 240 of the shank 220 and the sealing surface 214 of the supply end 208. The connecting device 90 holds the internal sealing surface 247 of the shank 220 to the sealing surface 214 of the supply end 208 in the sealing engagement. During normal operation, the connecting device 90 prevents this sealing engagement from becoming unsealed.

The connecting device 90 also shrouds the o-rings 249 on the supply end 208. The connecting device 90, in this way, protects the o-rings 249 during shipping and/or before final installation. A scarred or damaged o-ring 249 might fail— leading to leaks and costly repairs. The connecting device 90 also shrouds the sealing surface 214 of the supply end 208. The connecting device 90 protects the sealing surface 214 during shipping and/or before final installation. Scarring or damage to the sealing surface 214 or debris on the sealing surface 214 might cause improper sealing—also leading to leaks and costly repairs.

The connecting device 90 includes walls 93 extending from a first end 105 to a second end 108. The walls 93 define or form the threaded internal diameter 255, which threadingly engages the threaded external diameter 242 of the upper end 240 of the shank 220. The walls 93 include an external surface 99 that may include any of a variety of scallops 102 or other gripping regions or surfaces.

When the fill valve 200 requires replacement, the connecting device 90 of the fill valve 200 is disconnected from the upper end 240 of the shank 220. As the connecting device 90 is in the toilet bowl tank 210, the fill valve 200 is easily replaced since there is easy access to the old fill valve 200 through the top opening of the tank 210. Further, as the shank 220 is not required to be removed from the opening 212 of the tank 210, water does not leak out through the opening 212. The integrity of the seal between the shank 220 and the tank 210 is not required to be interrupted by the replacement of the fill valve 200.

The connecting device 90 for engaging the fill valve 210 to the shank 220 may include any of variety of devices, such as nuts, threaded connectors, push-pull connectors, snap connectors, quarter or half turn nuts, etc. The connecting device 90 holds or maintains the sealing engagement between the supply end 208 of the fill valve 210 and the upper end 240 of the shank 220.

The connecting device 90 may formed from thermoplastics, such as glass filled nylon, polyethylene, polypropylene, or acrylonitrile butadiene styrene. The shank 220 may be formed from brass, metals, metal alloys, and plastics typically used in the plumbing industry.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

What is claimed is:

1. A fill valve assembly for a toilet tank, comprising:
a shank, the shank comprising a lower end and an upper end, the upper end comprising an internal diameter, a threaded external diameter, and a lip;
a fill valve, the fill valve comprising a shaft, a supply end, and a connecting device, wherein an outer diameter of the supply end retains one or more o-rings, wherein the connecting device is a nut, the nut is rotatably integrated to the supply end of the fill valve by a retaining ring, the retaining ring is received by a groove in the outer diameter of the supply end of the fill valve, the retaining ring holds the nut to the supply end, the nut comprises a threaded internal diameter to engage with the threaded external diameter of the upper end of the shank;
a washer positioned between the lip of the shank and the toilet tank;
a seal positioned between the washer and the toilet tank;
the one or more o-rings of the supply end seal against the internal diameter of the upper end of the shank;
the washer receiving a force from the lip to press the washer against the seal to seal the shank to the toilet tank; and,
the nut secures the supply end of the fill valve to the upper end of the shank to maintain the seal between the supply end and the upper end of the shank.

2. The fill valve assembly according to claim 1, wherein the internal diameter of the upper end of the shank is smooth.

3. The fill valve assembly according to claim 1, wherein the connecting device shrouds or protects a sealing surface of the supply end, and wherein the sealing surface is an external surface of the supply end.

4. The fill valve assembly according to claim 3 wherein the sealing surface of the supply end includes one or more grooves.

5. The fill valve assembly according to claim 4, wherein the sealing surface is generally smooth between the one or more grooves.

6. The fill valve assembly according to claim 4, wherein the one or more grooves retain the one or more o-rings to form the seal between the external sealing surface of the supply end and an internal sealing surface of the internal diameter of the upper end of the shank.

7. The fill valve assembly according to claim 1, wherein the connecting device is positioned in the toilet tank.

8. The fill valve assembly according to claim 1, wherein the nut is held to the supply end of the fill valve, and the nut is configured to freely rotate relative to the supply end until the nut is secured to the upper end of the shank.

9. The fill valve assembly according to claim 1, wherein the nut is rotatably integrated to and held to the fill valve via the retaining ring prior to installation of the fill valve into the toilet tank, the nut is configured to freely rotate relative to the supply end until the nut is secured to the upper end of the shank, and the threaded internal diameter of the nut is configured to threadably secure with the threaded external diameter of the upper end of the shank to maintain the seal of the one or more o-rings of the supply end against the internal diameter of the upper end of the shank.

10. The fill valve assembly according to claim 8, wherein the nut shrouds an external sealing surface on the outer diameter of the supply end of the fill valve.

11. The fill valve assembly according to claim 1, wherein the supply end of the shaft ending in a tip, and the nut is rotatably integrated and held around the tip of the supply end of the fill valve by the retaining ring.

12. The fill valve assembly according to claim 1, wherein an annular gap is formed between the threaded internal diameter of the nut and a sealing surface of the supply end, and the annular gap forms a space or void that is sized to receive the upper end of the shank.

13. The fill valve assembly according to claim 1, wherein the toilet tank defines a reservoir to hold water, an opening is in a bottom wall of the toilet tank, the shank passes through the opening, an additional nut secures the shank to the toilet tank, wherein the additional nut tightens against a lower surface of the bottom wall, and the fill valve connects to the upper end of the shank, wherein the upper end passes into an interior of the toilet tank.

14. A fill valve assembly for a toilet tank, comprising:
- a shank, the shank comprising a lower end, an upper end, and a lip disposed between the lower end and the upper end, the upper end comprising a first sealing surface on an internal diameter of the shank;
- a fill valve, the fill valve comprising a shaft, a nut rotatably integrated to the shaft by a retaining ring, the retaining ring is received by a groove in an external diameter of the shaft of the fill valve, the retaining ring holds the nut to the shaft, and a second sealing surface on the external diameter of the shaft holding one or more o-rings;
- a washer positioned between the lip of the shank and the toilet tank;
- a seal positioned between the washer and the toilet tank;
- the first sealing surface of the shank seals with the second sealing surface of the fill valve;
- the washer receiving a force from the lip to press the washer against the seal to seal the shank to the toilet tank; and,
- the nut engages the fill valve to the upper end of the shank.

15. A fill valve for a toilet tank, comprising:
- a float;
- a shaft, the shaft comprising a lower end and a lip, the lower end having an external sealing surface retaining one or more o-rings; and,
- a nut rotatably integrated to the lower end of the shaft by a retaining ring, the retaining ring is received by a groove in an exterior of the lower end of the shaft, the retaining ring holds the nut to the lower end of the shaft, and the nut covers at least a portion of the external sealing surface of the shaft;
- a washer positioned between the lip of the shank and the toilet tank; and
- a seal positioned between the washer and the toilet tank, the washer receiving a force from the lip to press the washer against the seal to seal the shank to the toilet tank.

16. A fill valve assembly, comprising:
- a fill valve comprising a male part, the male part retains one or more o-rings positioned about an exterior of the male part;
- a shank comprising a female part and a lip, the female part comprising an internal sealing surface and an outer engaging surface;
- the internal sealing surface of the female part receives the male part in a sealing engagement;
- a nut rotatably integrated to the male part by a retaining ring, the retaining ring is received by a groove in the exterior of the male part of the fill valve, the retaining ring holds the nut to the male part of the fill valve; and,
- the nut engages the outer engaging surface of the female part to hold the male part and the female part together to maintain the sealing engagement;
- a washer positioned between the lip of the shank and a tank; and
- a seal positioned between the washer and the tank, the washer receiving a force from the lip to press the washer against the seal to seal the shank to the tank.

17. A method of installing a fill valve for a toilet tank, comprising:
- passing a shank through an opening of a toilet tank, wherein an upper end of the shank is in the toilet tank, and wherein the upper end of the shank includes a threaded external diameter and a lip;
- providing a washer and a seal, the washer positioned between the lip of the shank and the toilet tank, the seal positioned between the washer and the toilet tank, the washer receiving a force from the lip to press the washer against the seal to seal the shank to the tank;
- providing a fill valve, the fill valve comprising a shaft, a supply end, and a nut, wherein an outer diameter of the supply end retains one or more o-rings, the nut is rotatably integrated to the supply end of the fill valve by a retaining ring, the retaining ring is received by a groove in the outer diameter of the supply end of the fill valve, the retaining ring holds the nut to the supply end, and the nut comprises a threaded internal diameter;
- engaging the fill valve to the upper end of the shank; and,
- tightening the threaded internal diameter of the nut to the threaded external diameter of the shank.

18. The method according to claim 17, further comprising tightening a nut to a lower end of the shank to further seal the shank to the tank.

19. The method according to claim 17, further comprising engaging the fill valve to the upper end of the shank in the tank of the toilet.

20. The method according to claim 17, further comprising engaging the nut to maintain a seal between the fill valve and the shank in the tank of the toilet.

21. The method according to claim 17, further comprising forming a seal between an external sealing surface of a supply end of the fill valve and an internal sealing surface of the shank.

22. The method according to claim 21, further comprising engaging the nut to maintain the seal between the external sealing surface of the supply end and the internal sealing surface of the shank, wherein the nut threadingly engages a threaded external surface of the shank.

23. A method of replacing a fill valve, comprising:
- disconnecting a first fill valve from a shank, wherein the shank passes through an opening of a toilet tank, wherein an upper end of the shank is in the toilet tank, and wherein a lip of the shank presses a washer against a seal to seal the shank to the toilet tank; and,
- connecting a second fill valve to the upper end of the shank, and the second fill valve comprising a shaft, a supply end, and a nut, wherein an outer diameter of the supply end retains one or more o-rings, the nut is rotatably integrated to the supply end of the fill valve by a retaining ring, the retaining ring is received by a groove in the outer diameter of the supply end of the fill valve, the retaining ring holds the nut to the supply end, and the nut comprises a threaded internal diameter.

24. The method according to claim 23, further comprising not removing the shank from the toilet tank.

25. The method according to claim 23, further comprising connecting the second fill valve to the upper end of the shank while the upper end of the shank is inside of the toilet tank.

* * * * *